United States Patent
Okamoto

(10) Patent No.: US 7,781,365 B2
(45) Date of Patent: Aug. 24, 2010

(54) ZIRCONIA-BASED MIXED OXIDE AND PRODUCTION PROCESS THEREOF

(75) Inventor: Hiroshi Okamoto, Osaka (JP)

(73) Assignee: Daiichi Kigenso Kagaku Kogyo Co., Ltd., Osaka-fu (JP)

( * ) Notice: Subject to any disclaimer, the term of this patent is extended or adjusted under 35 U.S.C. 154(b) by 224 days.

(21) Appl. No.: 11/763,044

(22) Filed: Jun. 14, 2007

(65) Prior Publication Data

US 2007/0293393 A1 Dec. 20, 2007

(30) Foreign Application Priority Data

Jun. 20, 2006 (JP) .............................. 2006-197451

(51) Int. Cl.
*B01J 23/06* (2006.01)
*B01J 23/10* (2006.01)
*C01F 17/00* (2006.01)
*C01G 23/02* (2006.01)

(52) U.S. Cl. ................. 502/303; 502/302; 502/304; 502/349; 423/263; 423/593.1; 423/594.12; 423/608

(58) Field of Classification Search ......... 502/302–304, 502/349; 423/263, 593.1, 594.12, 608
See application file for complete search history.

(56) References Cited

U.S. PATENT DOCUMENTS

| 6,171,572 | B1 | 1/2001 | Aozasa |
| 6,214,306 | B1 | 4/2001 | Aubert et al. |
| 6,228,799 | B1 | 5/2001 | Aubert et al. |
| 2006/0115397 | A1 * | 6/2006 | Hedouin .................. 423/213.2 |
| 2006/0178261 | A1 | 8/2006 | Larcher et al. |

FOREIGN PATENT DOCUMENTS

| EP | 0842900 A1 | 5/1998 |
| EP | 0955267 A1 | 11/1999 |
| EP | 1035074 A1 | 9/2000 |
| JP | 10-194742 A | 7/1998 |
| JP | 3490456 B | 11/2003 |
| JP | 3623517 B2 | 12/2004 |
| JP | 2006-513973 A | 4/2006 |
| WO | WO 2004/085806 A2 | 10/2004 |
| WO | WO 2007/093593 A1 | 8/2007 |
| WO | WO 2007/107546 A1 | 9/2007 |

OTHER PUBLICATIONS

European Search Report dated Oct. 31, 2007 issued in corresponding European patent application No. 07110580.

* cited by examiner

*Primary Examiner*—Timothy C Vanoy
*Assistant Examiner*—Diana J Liao
(74) *Attorney, Agent, or Firm*—Westerman, Hattori, Daniels & Adrian, LLP

(57) ABSTRACT

The present invention provides a zirconia-based mixed oxide which, together with improving the heat resistance of specific surface area at a high temperature (1000° C. for 3 hours), has a ceria reduction rate of 80% or more, or in other words, improves the heat resistance of specific surface area and the reduction rate of ceria. The zirconia-based mixed oxide has zirconia for the main component thereof and contains 5% or more of ceria and 1 to 30% of a rare earth metal oxide other than ceria, wherein the specific surface area after heat treating for 3 hours at 1000° C. is 50 $m^2/g$ or more, the reduction rate of the ceria contained in the mixed oxide is 80% or more, and preferably the specific surface area after heat treating for 3 hours at 1100° C. is 20 $m^2/g$ or more.

3 Claims, No Drawings

ZIRCONIA-BASED MIXED OXIDE AND PRODUCTION PROCESS THEREOF

FIELD OF THE INVENTION

The present invention relates to a zirconia-based mixed oxide and a production process thereof.

BACKGROUND OF THE INVENTION

The specific surface area of zirconia units conventionally used as catalyst supports is at most about 100 m²/g at 400° C. In addition, those having a greater specific surface area are typically amorphous without having a crystal structure. Consequently, even if a zirconia unit is used as a catalyst support, as a result of the specific surface area decreasing at high temperatures of 400° C. or higher, it is not possible to obtain stable performance at high temperatures. Thus, it is necessary to further improve heat resistance in order to use as a catalyst support.

In contrast, zirconia-ceria compositions composed of zirconium oxide and cerium oxide are typically able to secure a comparatively large specific surface area even at a high temperature of 1000° C., and have heat resistance superior to that of zirconia and the like when used as a catalyst.

At present, there have been numerous reports of attempts to further improve heat resistance by adding rare earth metal oxides or alkaline earth metal oxides and the like other than ceria to zirconia-ceria compositions.

In actuality, however, since the important function of a co-catalyst, in addition to heat resistance, is the oxidation-reduction potential of ceria in an oxidation-reduction atmosphere, it is becoming an indispensable characteristic for improving catalyst performance.

Japanese Patent No. 3490456 describes a "composition having for a base material thereof a zirconium oxide containing cerium oxide and at least one type of doping element; wherein, the composition is provided in the form of a single phase of zirconium oxide crystallized into a cubic system or tetragonal system, the cerium oxide and doping element contained therein is present as a solid solution, and the composition has a specific surface area of 25 to 51 m²/g after firing for 6 hours at 1000° C.".

In addition, Japanese Patent Application Publication No. H10-194742 describes a "zirconium-cerium-based mixed oxide obtained by firing at 500 to 1000° C.; wherein, the mixed oxide contains zirconium and cerium, the mixing ratio of the zirconium and cerium as zirconium oxide and cerium (IV) oxide is 51 to 95:49 to 5 as the weigh ratio thereof, the mixed oxide demonstrates a specific surface area after the firing for 6 hours at 500 to 1000° C. of at least 50 m²/g, and maintains a specific surface area of at least 20 m²/g after heating for 6 hours at 1100° C.".

However, there is no description regarding the reduction rate of ceria in Japanese Patent No. 3490456 and Japanese Patent Application Publication No. H10-194742.

On the other hand, Japanese Patent No. 3623517 describes a "composition comprising cerium oxide and zirconium oxide of at least one cerium/zirconium atomic ratio; wherein the composition demonstrates a specific surface area of at least 35 m²/g after firing for 6 hours at 900° C., and demonstrates an oxygen storage capacity of 1.5 ml/g at 400° C.".

However, the ceria reduction rate is described in the examples as being a low value of a maximum of about 12%.

Moreover, Published Japanese Translation No. 2006-513973 of a PCT International Publication describes a "composition containing zirconium oxide and cerium oxide having a ratio of zirconium oxide of at least 50% by weight; wherein, the maximum reducibility temperature after firing for 6 hours at 500° C. is 500° C. or lower, the specific surface area is 40 m²/g or more, and the composition is in the form of a tetragonal system phase."

However, although reduction rate of ceria is described as being 80% in the examples, the specific surface area of 38 m²/g after heat treatment for 6 hours at 1000° C. is not satisfactory in terms of heat resistance.

SUMMARY OF THE INVENTION

With the foregoing in view, an object of the present invention is to provide a zirconia-based compound oxide which, together with improving the heat resistance of specific surface area at a high temperature (1000° C. for 3 hours), has a ceria reduction rate of 80% or more, or in other words, improves the heat resistance of specific surface area and the reduction rate of ceria.

As a result of conducting extensive studies to achieve the above-mentioned object, the inventors of the present invention unexpectedly found that a zirconia-based mixed oxide is obtained that improves the heat resistance of specific surface area and the reduction rate of ceria by fabricating a mixed hydroxide containing zirconium and a rare earth other than cerium, followed by fabricating a compound hydroxide containing zirconium, a rare earth other than cerium and cerium that formed a cerium hydroxide layer on the outside thereof, and subjecting to heat treatment.

The present invention provides the following on the basis of this finding.

1. A zirconia-based mixed oxide comprising 1) zirconia for the main component, 2) 5 wt % or more of ceria and 3) 1 to 30 wt % of a rare earth metal oxide other than ceria, wherein the specific surface area after heat treating for 3 hours at 1000° C. is 50 m²/g or more, and the reduction rate of the ceria in the mixed oxide is 80% or more.

2. The zirconia-based mixed oxide according to above 1, wherein the specific surface area after heat treating for 3 hours at 1100° C. is 20 m²/g or more.

3. The zirconia-based mixed oxide according to above 1 or 2, wherein the rare earth metal oxide other than ceria includes at least one of an oxide of lanthanum and an oxide of neodymium.

4. A method for producing a zirconium-based mixed oxide, comprising the steps of:

(1) mixing a zirconium salt with a salt of a rare earth metal other than ceria in a solvent to obtain a solution containing zirconium and a rare earth other than cerium;

(2) adding an alkali to the solution to obtain a mixed hydroxide containing zirconium and a rare earth other than cerium;

(3) dispersing the mixed hydroxide in water to obtain a slurry followed by adding a cerium salt to the slurry;

(4) adding an alkali to the cerium salt added slurry to obtain a mixed hydroxide containing zirconium, a rare earth other than cerium and cerium; and (5) heat-treating the mixed hydroxide to obtain a mixed oxide comprising zirconia, a rare earth metal oxide other than ceria and ceria.

5. The method for producing a zirconia-based mixed oxide according to above 4, wherein the salt of a rare earth metal other than ceria includes at least one of a salt of lanthanum and a salt of neodymium.

ADVANTAGES OF THE INVENTION

According to the present invention, a zirconia-based compound oxide which, together with improving the heat resistance of specific surface area at a high temperature (1000° C. for 3 hours), has a ceria reduction rate of 80% or more, or in other words, improves the heat resistance of specific surface area and the reduction rate of ceria, and a simple production process thereof, can be provided, and can be preferably used as a catalyst material for treating internal combustion engine exhaust gas and the like in this field.

DESCRIPTION OF THE PREFERRED EMBODIMENTS

The following provides a detailed explanation of the zirconia-based compound oxide of the present invention and a production process thereof.

Furthermore, the zirconia referred to in the present invention is a typically zirconia containing no more than 10% by weight of impurity metals, including hafnia.

1. Zirconia-Based Mixed Oxide

The zirconia-based compound oxide of the present invention is a compound oxide comprising mainly of zirconia and containing 5 wt % or more of ceria and 1 to 30 wt % of a rare earth metal oxide other than ceria; wherein, the specific surface area following heat treatment at 1000° C. for 3 hours is 50 m$^2$/g or more, and the reduction rate of the ceria contained in the mixed oxide is 80 wt % or more.

First, the composition comprises mainly of zirconia. More specifically, the zirconia content is 50 to 90 wt % and preferably 55 to 85 wt %. If the zirconia content is less than 50 wt %, or more than 90 wt %, the specific surface area following heat treatment at 1000° C. is less than 50 m$^2$/g, thereby making this undesirable.

The ceria content is 5 wt % or more, and more specifically, 5 to 49 wt % and preferably 5 to 40 wt %. If the ceria content is less than 5 wt %, the specific surface area following heat treatment at 1000° C. is less than 50 m$^2$/g, while if the ceria content exceeds 49 wt %, the ceria reduction rate is less than 80% and the reduction rate decreases, thereby making this undesirable.

The content of rare earth metal oxide other than ceria is 1 to 30 wt % and preferably 5 to 25 wt %. If the content of rare earth metal oxide is less than 1 wt % or more than 30 wt %, the specific surface area following heat treatment at 1000° C. is less than 50 m$^2$/g, thereby making this undesirable.

Furthermore, examples of rare earth metal oxides other than ceria include oxides of lanthanoid elements such as scandium, yttrium, lanthanum, praseodymium and neodymium. Among these, at least one type of oxide of either lanthanum or neodymium is preferably contained, and at least lanthanum and neodymium are particularly preferably contained.

Next, the zirconia-based mixed oxide of the present invention has a specific surface area following heat treatment for 3 hours at 1000° C. of 50 m$^2$/g or more, and preferably 55 m$^2$/g or more, and the reduction rate of ceria contained in the mixed oxide is 80% or more and preferably 82% or more.

If the specific surface area following heat treatment for 3 hours at 1000° C. is less than 50 m$^2$/g, the rate of deterioration from the initial specific surface area is high, sintering of platinum group metal particles is accelerated by thermal contraction of the support, thereby making this undesirable.

Furthermore, the reduction rate of the ceria is defined as 100% when the total amount of ceria contained in the zirconia-based mixed oxide is subjected to an oxidation-reduction reaction ($CeO_2 \Leftrightarrow \frac{1}{2}Ce_2O_3 + \frac{1}{4}O_2$) (or using a different expression, the reduction rate of ceria is defined as 100% when OSC (oxygen storage capacity) is 0.25 mol-$O_2$/mol-$CeO_2$).

Moreover, the zirconia-based mixed oxide of the present invention preferably has a specific surface area of 20 m$^2$/g or more following heat treatment for 3 hours at 1100° C. If the specific surface area following heat treatment for 3 hours at 1100° C. is less than 20 m$^2$/g, sintering of platinum group metal particles is accelerated due to thermal contraction of the support, thereby making this undesirable.

In this manner, together with improving the heat resistance of specific surface area at a high temperature (1000° C.×3 hours), the zirconia-based mixed oxide of the present invention was determined to improve the reduction rate of ceria to 80% or more, namely improve the heat resistance of specific surface area and the reduction rate of ceria.

This is thought to be because, in contrast to the surface composition and bulk composition exhibiting identical values in the case of conventional products, in the present invention, rare earth metals other than cerium, preferably at least one type of either lanthanum or neodymium, and particularly preferably at least lanthanum and neodymium, are coprecipitated with zirconium in advance to synthesize an addition-type hydroxide of rare earth metals other than ceria, followed by adding, neutralizing and precipitating cerium ions to demonstrate the effects of enhancing the cerium ratio in the surface portion of the powder and highly dispersing the cerium of the surface layer.

2. Zirconia-Based Mixed Oxide Production Process (Step 1)

First, in the present invention, a zirconium salt and a salt of a rare earth metal other than cerium are mixed in a solvent to obtain a solution containing zirconium and a rare earth other than cerium.

There are no particular limitations on the zirconium salt. Examples of the zirconium salt which that can be used include basic zirconium sulfate, zirconium oxynitrate, zirconium oxychloride and zirconium nitrate.

In the present invention, basic zirconium sulfate is used preferably for the reason of being suitable for commercial production.

There are no particular limitations on the basic zirconium sulfate, and examples include hydrates of compound represented by, for example, $ZrOSO_4 \cdot ZrO_2$, $5ZrO_2 \cdot 3SO_3$ and $7ZrO_2 \cdot 3SO_3$ or the like. One type or two or more types thereof can be used.

Furthermore, basic zirconium sulfate can be easily prepared by mixing a zirconium salt solution (such as $ZrOCl_2$) and a sulfating agent (such as $Na_2SO_4$, $H_2SO_4$ or $(NH_4)_2SO_4$) and heating to not less than 65° C. but less than 80° C. followed by holding (aging) for a predetermined amount of time.

The sulfating agent is added such that the weight ratio of the sulfate radical ($SO_4^{2-}$) to $ZrO_2$ is preferably 0.4 to 0.6, and the free acid concentration of the mixture is preferably 0.2 to 2.2 N (normal). Examples of free acids include sulfuric acid, nitric acid and hydrochloric acid, and although there are no particular limitations thereon, hydrochloric acid is preferably from the standpoint of having superior productivity on an industrial scale.

Next, examples of rare earth metals other than cerium include sulfates and chlorides of lanthanoid elements such as scandium, yttrium, lanthanum, praseodymium and neodymium. Among these, at least one of either a lanthanum salt or a neodymium salt is preferably contained, while at least a lanthanum salt and a neodymium salt are particularly preferably contained.

On the other hand, although there are no particular limitations on the concentrations of the zirconium salt and salt of a rare earth metal other than cerium in the mixture containing a zirconium salt and salt of a rare earth metal other than cerium, the concentration of the zirconium salt is 5 to 25% by weight of $ZrO_2$ equivalent, while the concentration of the salt of a rare earth metal other than ceria is 5 to 25% by weight of $Re_2O_3$ equivalent (wherein Re represents a rare earth metal other than cerium).

In this manner, a solution containing a zirconium salt and a salt of a rare earth metal other than cerium is produced in step 1.

In this step, water (pure water or ion exchange water, in particular) can be preferably used as a solvent.

(Step 2)

Next, an alkali is added to the solution containing zirconium and a rare earth other than cerium produced in step 1 to obtain a mixed hydroxide containing zirconium and a rare earth other than cerium.

There are no particular limitations on the alkali, and examples of alkali that can be used include ammonium hydroxide, ammonium bicarbonate, sodium hydroxide and potassium hydroxide. Among these, sodium hydroxide is used preferably for the reason that it can be used inexpensively and industrially.

There are no particular limitations on the amount of alkali added provided it allows the formation of a precipitate from the above-mentioned solution, and the pH of the solution is normally made to be 11 or higher and preferably 12 or higher.

Furthermore, following completion of the neutralization reaction, the solution containing a mixed hydroxide containing zirconium and a rare earth other than cerium preferably is held for 1 hour or more at 35 to 60° C. from the viewpoint of facilitating aging and filtration of the resulting precipitate.

The formed precipitate composed of a mixed hydroxide containing zirconium and a rare earth other than cerium is then recovered by a solid-liquid separation method. The solid-liquid separation may carried out in accordance with a known method such as filtration, centrifugal separation or decantation. Following recovery, the mixed hydroxide containing zirconium and a rare earth metal other than cerium is preferably washed as necessary to remove adhered impurities.

Furthermore, although the resulting mixed hydroxide may also be dried as necessary, in the present invention, it is normally not required to be dried since it is used in the subsequent step.

(Step 3)

In step 3, the mixed hydroxide containing zirconium and a rare earth metal other than cerium is dispersed in water to obtain a slurry followed by adding a cerium salt to the slurry.

Although there are no particular limitations on the slurry concentration, it is normally 5 to 25% by weight as oxide ($ZrO_2+Re_2O_3$).

Although examples of the cerium salt include hydrochlorides, nitrates and sulfates, hydrochlorides are preferable from the standpoint of having superior productivity on an industrial scale.

Although there are no particular limitations on the concentration of the cerium salt, and is 5 to 25% by weight of oxide ($CeO_2$) equivalent.

(Step 4)

In step 4, an alkali is added to the slurry containing a cerium salt produced in step 3 to obtain a mixed hydroxide containing zirconium, a rare earth metal other than cerium and cerium.

There are no particular limitations on the alkali, and examples of alkalis that can be used include ammonia, ammonium bicarbonate, sodium hydroxide and potassium hydroxide. Among these, ammonia is preferable for the reason of being able to be used inexpensively and industrially.

There are no particular limitations on the amount of alkali added provided it allows the formation of a precipitate from the above-mentioned solution, and the pH of the solution is normally 9 or higher and preferably 10 or higher.

The formed precipitate composed of the mixed hydroxide containing zirconium, a rare earth metal other than cerium and cerium is recovered using a solid-liquid separation method. The solid-liquid separation is carried out in accordance with a known method such as filtration, centrifugal separation or decantation. Following recovery, the mixed hydroxide containing zirconium, a rare earth metal other than cerium and cerium is preferably washed as necessary to remove adhered impurities.

Furthermore, the resulting mixed hydroxide may also be further dried as necessary. The drying method may be any known drying method such as air drying or hot air drying. In addition, grinding or classification treatment and so on may also be carried out as necessary following drying treatment.

(Step 5)

Finally, a mixed oxide containing zirconia, a rare earth metal oxide other than ceria and ceria is obtained by heat treating the mixed hydroxide containing zirconium, a rare earth metal other than cerium and cerium.

Although there are no particular limitations on the heat treatment temperature, heat treatment is normally carried out for 1 to 5 hr at about 400 to 900° C. As a result of this treatment, a mixed oxide can be obtained that contains zirconia, a rare earth metal oxide other than ceria and ceria.

Although there are no particular limitations on the heat treatment atmosphere, heat treatment is normally carried out in air or an oxidizing atmosphere.

Furthermore, the mixed oxide obtained in this manner can be crushed as necessary. There are no particular limitations on this crushing, and crushing can be carried out with a crushing machine such as a planetary mill, ball mill or jet mill.

EXAMPLES

The following provides a further explanation of the characteristics of the present invention by indicating examples thereof. Furthermore, the present invention is not limited to these examples.

Each of the physical properties was measured using the methods indicated below in the examples.

(1) Specific Surface Area

Specific surface area was measured according to the BET method using a specific surface area measuring instrument (Flowsorb II, Micromeritics Corp.).

(2) Oxygen Storage Capacity (OSC) and Reduction Rate $H_2$-TPR was determined according to the Temperature Programmed Reduction method (Multitask T. P. R., Bel Japan Inc.).

More specifically, 0.3 g of powder were sufficiently oxidized by heating to 600° C. and holding for 60 minutes in highly pure oxygen gas. Next, the powder was heated from 100° C. to 900° C. at a heating rate of 10° C./min in a 5% hydrogen-argon gas flow (100 sccm), and the hydrogen consumed during this time was measured continuously with a quadrupole mass spectrometer to obtain a water vapor generation curve accompanying the rise in temperature. The amount of oxygen released was then determined from the resulting hydrogen consumption curve and the area thereof.

Furthermore, the ceria reduction rate was determined from the following equation.

Reduction rate=((OSC:mol-$O_2$)/0.25 mol/mol-$CeO_2$)×100

Example 1

10% lanthanum nitrate (9 g of $La_2O_3$ equivalent) and 10% neodymium nitrate (16 g of $Nd_2O_3$ equivalent) were added to a slurry of basic zirconium sulfate (70 g of $ZrO_2$ equivalent) followed by the addition of 400 g of 25% sodium hydroxide.

Subsequently, the mixture was filtered and washed with water to obtain an La—Nd-added Zr hydroxide. This hydroxide was then dispersed in water so that the oxide was present at 5% to obtain a slurry. 10% cerium nitrate (5 g as $CeO_2$) was added to this slurry after which the slurry was neutralized using 200 g of 25% ammonia followed by filtering and washing with water to obtain a hydroxide. The resulting hydroxide was fired for 5 hours at 650° C. in air to obtain an oxide.

The specific surface area of this oxide was measured after firing for 3 hours at 1000° C. and for 3 hours at 1100° C. in air. In addition, OSC was measured together with calculating the reduction rate.

Those results are shown in Table 1 along with the analysis values.

Example 2

10% lanthanum nitrate (9 g of $La_2O_3$ equivalent) and 10% neodymium nitrate (11 g of $Nd_2O_3$ equivalent) were added to a slurry of basic zirconium sulfate (70 g of $ZrO_2$ equivalent) followed by the addition of 400 g of 25% sodium hydroxide.

Subsequently, the mixture was filtered and washed with water to obtain an La—Nd-added Zr hydroxide. This hydroxide was then dispersed in water so that the oxide was present at 5% to obtain a slurry. 10% cerium nitrate (10 g of $CeO_2$ equivalent) was added to this slurry after which the slurry was neutralized using 200 g of 25% ammonia followed by filtering and washing with water to obtain a hydroxide. The resulting hydroxide was fired for 5 hours at 650° C. in air to obtain an oxide.

This oxide was measured in the same manner as the example 1. Those results are shown in Table 1 along with the analysis values.

Comparative Example

A mixed solution was prepared to which had been added zirconium nitrate (88 g of $ZrO_2$ equivalent), 10% cerium nitrate (5 g of $CeO_2$ equivalent), 10% lanthanum nitrate (2 g of $La_2O_3$ equivalent) and 10% neodymium nitrate (5 g of $Nd_2O_3$ equivalent). After adding 500 g of 25% ammonium to this mixed solution, filtering and washing were carried out to obtain a hydroxide. The resulting hydroxide was fired for 5 hours at 650° C. in air to obtain an oxide. This oxide was measured in the same manner as in the example 1. Those results are shown in Table 1 along with the analysis values.

TABLE 1

Analytical Values and Measurement Results

|  | Example 1 | Example 2 | Comparative Example |
|---|---|---|---|
| $ZrO_2$ (wt %) | 70.0 | 70.0 | 88.0 |
| $CeO_2$ (wt %) | 5.0 | 10.0 | 5.0 |
| $La_2O_3$ (wt %) | 9.0 | 9.0 | 2.0 |
| $Nd_2O_3$ (wt %) | 16.0 | 11.0 | 5.0 |
| SA ($m^2$/g) | 84.9 | 82.6 | 60.3 |
| Aged SA[*1] ($m^2$/g) | 55.3 | 55.8 | 31.5 |
| Aged SA[*2] ($m^2$/g) | 21.9 | 22.0 | 8.6 |
| OSC (mol-$O_2$/mol-$CeO_2$) | 0.22 | 0.21 | 0.16 |
| Ceria reduction rate (%) | 88.0 | 84.0 | 64.0 |

[*1]After heat treatment for 3 hours at 1000° C.
[*2]After heat treatment for 3 hours at 1100° C.

According to Table 1, the articles of the present invention of Examples 1 and 2 demonstrated a specific surface area after heating for 3 hours a 1000° C. of about 55 $mg^2$/g, a specific surface area after heating for 3 hours at 1100° C. of about 22 $m^2$/g, OSC of 0.21 to 0.22 mol-$O_2$/mol-$CeO_2$, and a ceria reduction rate of 84 to 88%. Thus, in comparison with the comparative example, the articles of the present invention can be seen to be extremely superior with respect to heat resistance of specific surface area at high temperatures and ceria reduction rate.

What is claimed is:

1. A zirconia-based mixed oxide comprising 1) zirconia for the main component, 2) 5 wt % or more of ceria and 3) 1 to 30 wt % of a rare earth metal oxide other than ceria, wherein
    the specific surface area after heat treating for 3 hours at 1000° C. is 50 $m^2$/g or more, and a ceria reduction rate in the mixed oxide is 80% or more.

2. The zirconia-based mixed oxide according to claim 1, wherein the specific surface area after heat treating for 3 hours at 1100° C. is 20 $m^2$/g or more.

3. The zirconia-based mixed oxide according to claim 1 or 2, wherein the rare earth metal oxide other than ceria includes at least one of an oxide of lanthanum and an oxide of neodymium.

\* \* \* \* \*